United States Patent [19]

Emter

[11] Patent Number: 5,152,193
[45] Date of Patent: Oct. 6, 1992

[54] COMBINATION TOP AND SIDE GRINDING MACHINE FOR CIRCULAR SAW BLADES

[76] Inventor: James Emter, 23429 NE. 29th Ave., Ridgefield, Wash. 98642

[21] Appl. No.: 727,544

[22] Filed: Jul. 9, 1991

Related U.S. Application Data

[63] Continuation-in-part of Ser. No. 664,088, Mar. 4, 1991, Pat. No. 5,088,358.

[51] Int. Cl.$^5$ ............................................. B23D 63/14
[52] U.S. Cl. ............................................ 76/41; 76/112
[58] Field of Search .................. 76/37, 40, 41, 42, 75, 76/43, 77, 76, 78.1, 79, 112

[56] References Cited

U.S. PATENT DOCUMENTS 3,304,810  2/1967  English ................................. 76/40
5,038,639  8/1991  Emter .................................... 76/41

FOREIGN PATENT DOCUMENTS 0202115  11/1986  European Pat. Off. ............... 76/37
0614875  6/1935  Fed. Rep. of Germany ......... 76/41

Primary Examiner—Roscoe V. Parker
Attorney, Agent, or Firm—Chernoff, Vilhauer, McClung & Stenzel

[57] ABSTRACT

A combination saw regrinder for a circular saw blade includes a side grinding assembly for sharpening the side facing portions of a first saw tooth and a top grinding assembly for sharpening the top portions of a second saw tooth comprises a synchronized actuator assembly for carrying out both sharpening operations at opposite radial ends of the saw blade during a single grinding cycle.

11 Claims, 4 Drawing Sheets

COMBINATION TOP AND SIDE GRINDING MACHINE FOR CIRCULAR SAW BLADES

This application is a continuation in part of my copending application Ser. No. 07/664,088 filed Mar. 4, 1991, now U.S. Pat. No. 5,088,358, and entitled AUTOMATIC DUAL-SIDE SAW BLADE GRINDER HAVING COMMON BLADE ADVANCEMENT AND CLAMP ACTUATOR AND METHOD OF USING SAME.

BACKGROUND OF THE INVENTION

The following invention relates to a machine for resharpening carbide tipped circular saw blades, and in particular, provides a combination saw regrinder for grinding the side portions and the top portion of the teeth of a circular saw blade substantially simultaneously.

Sharpening machines for circular saw blades have in the past been of three distinct varieties because the carbide tipped teeth of circular saw blades have multiple surfaces, and each surface must be periodically resharpened. The side facing areas of these saw teeth are typically reground in what has come to be known as a dual side grinder. Examples of dual side grinders are shown in Emter U.S. Pat. No. 4,823,649, Emter U.S. Pat. No. 4,846,023 and Emter U.S. Pat. No. 4,901,604. These patents all disclose saw blade grinders which automatically advance a multiple tooth circular saw blade one tooth at a time, index each tooth relative to a pair of side grinding wheels, clamp the blade against side-to-side movement and then sharpen both side surfaces of each tooth. This operation continues in sequence until each tooth has been sharpened.

The advancing face portion of each saw tooth must also be sharpened. A machine adaptable for the grinding of the face of each tooth of a circular saw blade is shown in Emter U.S. patent application Ser. No. 07/429,396 filed Oct. 31, 1989 and entitled SAW BLADE TOP AND FACE GRINDER. The machine of the aforementioned application, the contents of which are incorporated herein by reference, is adaptable for also grinding the top portions of circular saw blade teeth. The top portion of each tooth is that surface which is tangent to the outer perimeter of the saw blade and substantially perpendicular to the advancing linear direction of the material being cut.

In the past, all three of these grinding operations were carried out on different machines. This meant that for total blade sharpening, the blade must be cycled through and resharpened tooth-by-tooth three separate times. This results in greater expense because three separate machines have to be maintained, and there is longer down time for each blade.

SUMMARY OF THE INVENTION

The present invention does away with need of having separate machinery for grinding the top and side portions of the teeth of a circular saw blade. According to the invention, a combination saw regrinder is provided which includes a side grinder and a top grinder. The side grinder includes a pair of rotary side grinding wheels for sharpening a first tooth of a circular saw blade and a top grinding wheel for sharpening a second tooth of the circular saw blade. The combination saw regrinder includes a synchronized actuator for causing the rotary side grinding wheels and the top grinding wheel to engage the first and second teeth, respectively, substantially simultaneously.

Two separate assemblies, a side grinding assembly and a top grinding assembly are located at opposite radial ends of the saw blade. A motorized cam actuates a reciprocating drive means for moving the side grinding wheels into and out of engagement with the first saw blade tooth. At the same time, the cam actuates a piston which moves the top grinding wheel into and out of engagement with the second saw blade tooth. Valves for air cylinders are also driven by the motorized cam for clamping the saw blade in place to prevent side-to-side movement during the sharpening operation. A mechanical linkage connected to the side clamping air cylinder is coupled to a rotary shaft for mounting the saw blade. When the side clamp releases, the mechanical linkage advances the saw blade rotationally to position the next tooth, one at each radial end of the saw, for sharpening.

All air cylinders and mechanical linkages for performing these operations are driven by a single motor driven cam actuator. This eliminates timing problems and enables all of the sequencing for the various positioning and sharpening operations to be controlled by a single motorized actuator.

It is a principal object of this invention to provide a combination dual side grinder and top grinder for the teeth of a circular saw blade in order to provide two distinct sharpening operations for the same blade.

A further object of this invention is to provide a synchronized saw regrinding machine for carrying out different saw sharpening operations on different teeth of the circular saw blade at the same time.

A still further object of this invention is to provide a saw regrinding machine capable of carrying out multiple grinding operations on different teeth at the same time, all synchronized through a common drive mechanism, thus obviating the need for separate motors, controls, and the like.

A still further object of this invention is to provide a single drive mechanism for sequencing a number of operations in a combination saw regrinder.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
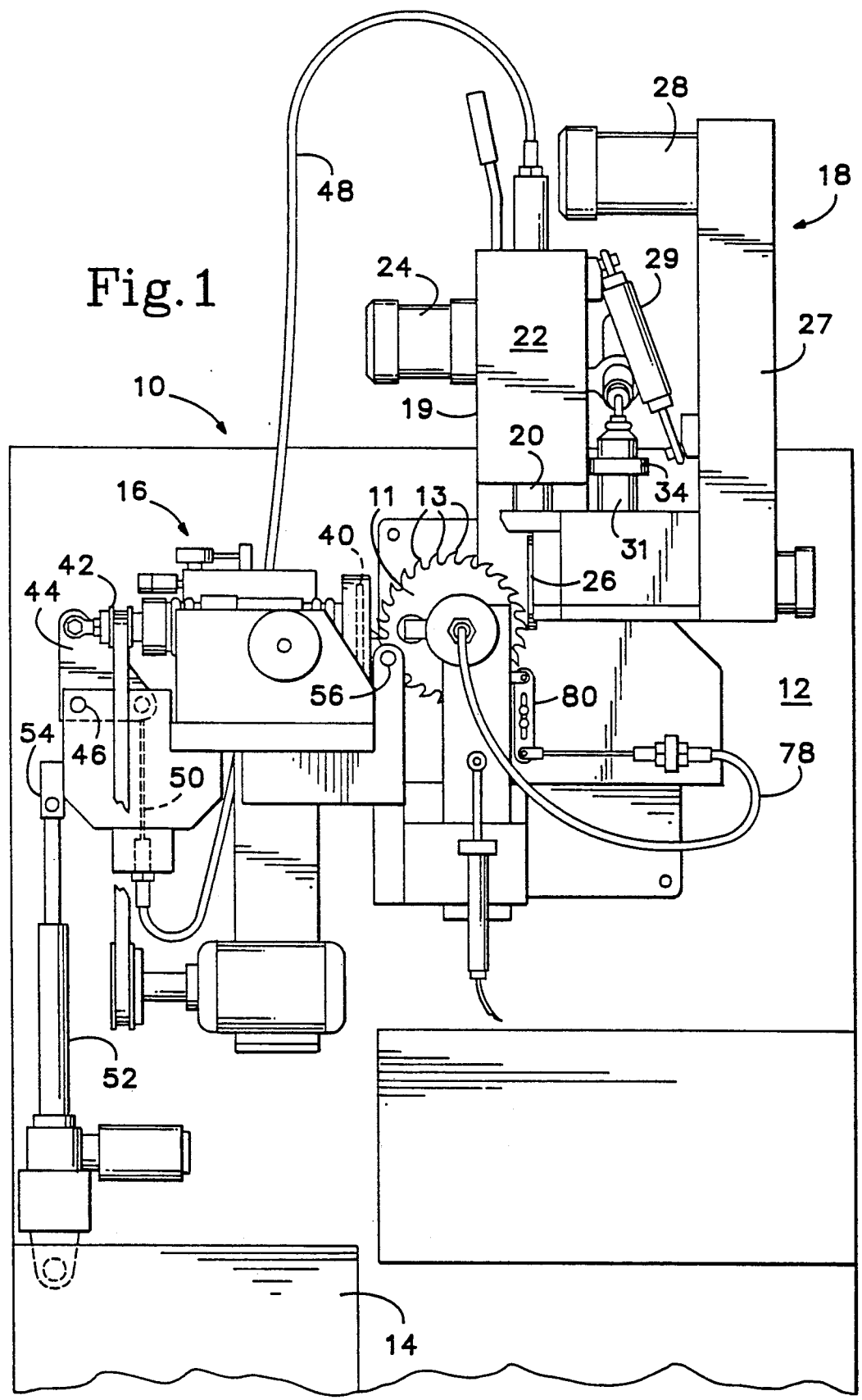
FIG. 1 is a side elevation view of the combination side and top grinder of the present invention.

Referring to FIG. 1 of the drawings, a combination side and top grinding machine 10 is supported on a frame 12 having a base 14 for supporting a dual side grinder assembly 16. A top grinder assembly 18 is rotatable about an axial bearing 20 which couples the top grinder assembly to a synchronized driver assembly 22. The synchronized driver assembly 22 is driven by a motor 24 and is mounted on a horizontal rotating shaft 112 supported by a side wall 15.

A saw blade 11 mounted between the assembly 16 and the assembly 18 includes a plurality of saw teeth 13. The teeth 13 are provided with carbide tips (not shown) as are conventional in circular saw blades of this type.

Figure 2:
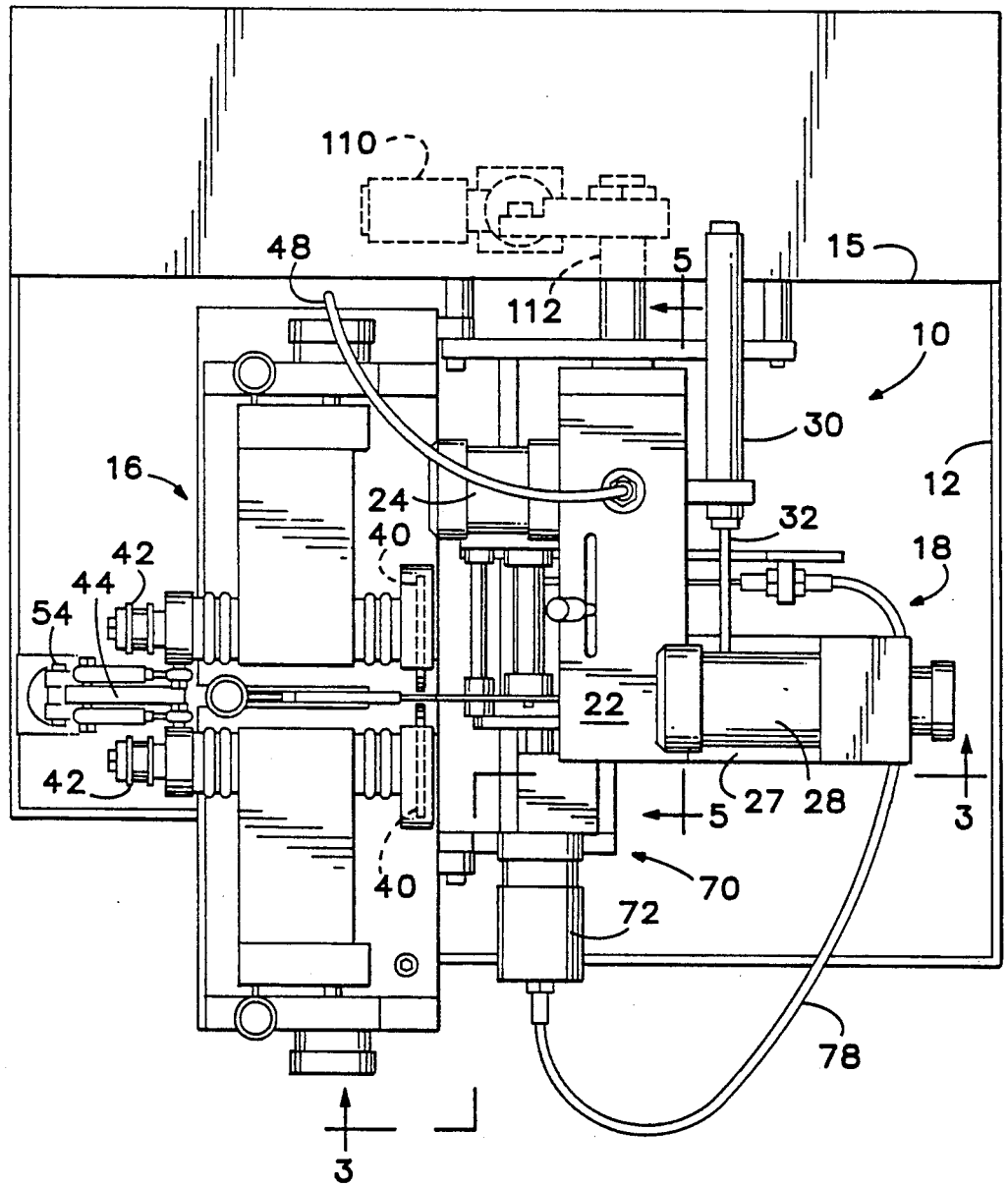
FIG. 2 is a top view of the combination saw regrinder of FIG. 1.

The top grinder assembly 18 operates substantially as described in the aforementioned U.S. patent application Ser. No. 07/429,396. As such the top grinder assembly 18 includes a top grinding wheel 26 driven by a motor 28 linked to the grinding wheel 26 by belts (not shown) enclosed by a housing 27. The top grinder assembly 18 swivels on a rotatable bearing 20 under the action of an air cylinder 30 (refer to FIG. 2). The air cylinder 30 includes an output piston 32 connected to a base 31 which includes a swivel stop ring 34. On each stroke of the air cylinder 30, the assembly 18 pivots about the bearing 20 until the stop ring 34 abuts the housing 19 of the synchronized driver assembly 22. This allows the top grinder assembly to grind the top portion of each saw blade tooth at an angle. The teeth are ground at opposite angles alternately and the angle may be changed by changing the size of the stop ring 34.

A second air cylinder 29 causes the top grinder assembly housing to bend slightly in order to provide a few thousandths of an inch of clearance between the saw teeth 13 and the grinding wheel as the saw blade 11 is rotated between grinding strokes.

The dual side grinder assembly 16 operates in a manner substantially similar to the dual side grinder disclosed in Emter U.S. Pat. No. 4,901,604 which is incorporated herein by reference. As shown in that patent, a pair of dual side grinding wheels 40 are mounted on spindles which are driven reciprocally along a linear path to grind the side facing areas of the teeth 38 of saw blade 36. The distal ends of a pair of belt-driven rotary spindles 42 couple to a bellcrank 44. The bellcrank 44 is coupled to the dual side grinder assembly 16 at a pivot point 46. The bellcrank 44 is driven by a mechanical link 48 which includes a semi-flexible push/pull rod 50. The opposite end of the mechanical link 48 is coupled to the synchronized driver assembly 22 whose operation will be explained below.

The saw blade 11 is clamped by a clamping mechanism 70 during grinding to prevent side-to-side movement. The clamping mechanism includes pads 63 and 65 mounted on respective guide shafts 62 and 64 that rest against one side of the saw blade 11 when the saw blade is mounted on a spindle 61. A pair of movable pads 76a and 76b located across the saw blade from the fixed pads 63 and 65 have mutually opposing faces. The movable pads 76a and 76b are mounted as extensions of a piston 74 at one end of a double acting two ended linear actuator such as a pneumatic piston cylinder 72.

A blade carriage shaft 58 includes a magnetic chuck 60 that is attached to the spindle 61 adjacent to the saw blade 11. The magnetic attraction between the chuck and the saw blade causes the saw blade to rotate with the spindle when the blade is not restrained, but permits the spindle to rotate without the blade when the blade is restrained. The spindle, and thus the saw blade, is rotated after each tooth 13 is sharpened to advance the next unsharpened tooth to the proper position for grinding. The spindle is rotated through a rocker bar/crankshaft linkage 80 that is activated by a push/pull cable 78 attached to the end of the pneumatic piston cylinder 72 opposite the piston 74. The position of the rocker link 81 relative to a mounting pin may be adjusted to provide more or less rotation for the saw blade in response to the stroke imparted by push/pull cable 78. This is to accommodate saw blades having different tooth spacings.

Figure 3:
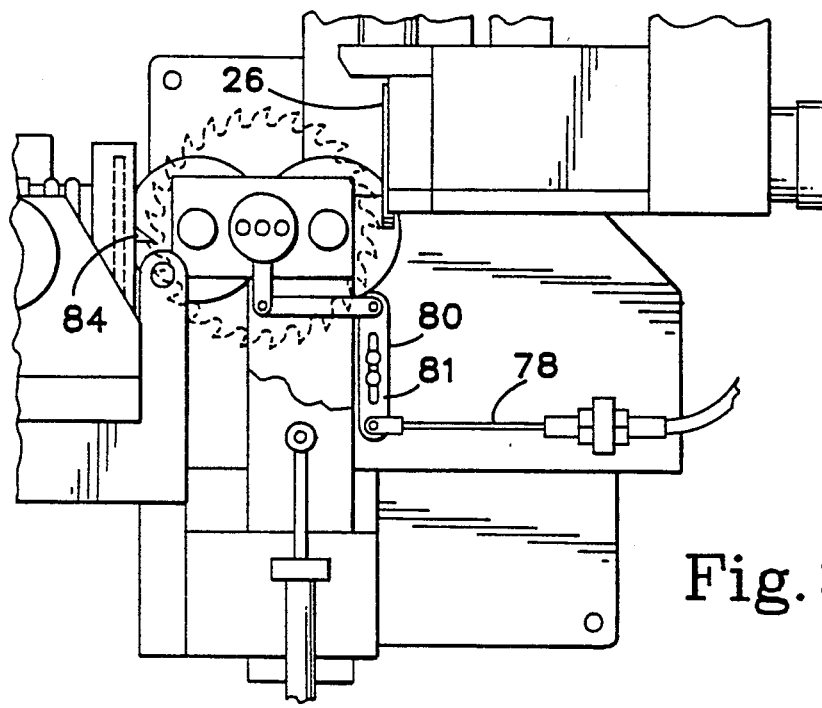
FIG. 3 is a partial side cutaway view taken along line 3—3 of FIG. 2.
Figure 4:
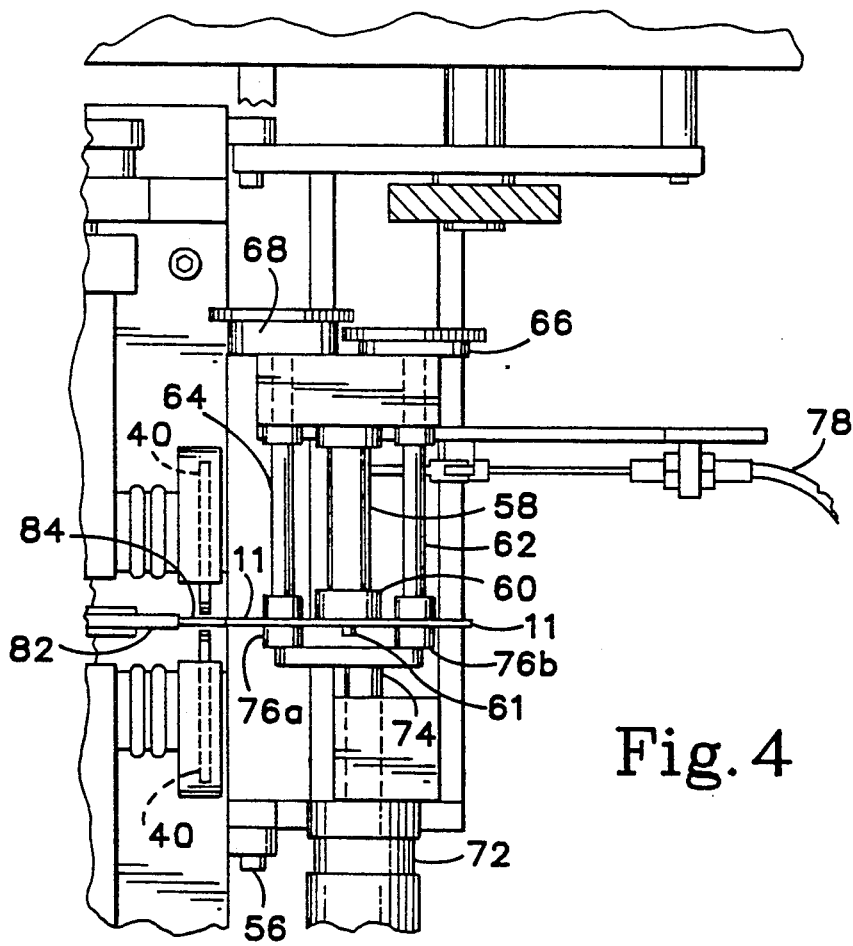
FIG. 4 is a partial detailed top view of the combination saw regrinding machine of FIG. 2 with a portion of the upper top grinding assembly removed.

The cable 78 and the rocker bar/crankshaft linkage 80 are arranged such that extension of the cable causes the saw blade to rotate over a greater arc than the arc defined by adjacent tooth center lines. As a tooth nears the end of its movement it deflects and passes under a stop 84. The stop 84 which is biased to return to the position shown in the drawings (see FIG. 3) by a spring (not shown) extends behind the tooth after the tooth is moved past it. Retraction of the cable 78 then rotates the saw blade back until the tooth contacts the stop. Further retraction of the cable is accommodated by slippage between the magnetic clutch 60 and the saw blade without further rotation of the saw blade. This stop 84 is positioned to place a tooth at the proper location relative to both sets of grinder wheels.

Different thicknesses of blades are accommodated by adjustment wheels 66 and 68 for the guide shafts 62 and 64 which regulate the position of pads 63 and 65. A slight differential adjustment may also be made through these wheels to provide a slight amount of tilt to the blade if necessary.

Figure 5:
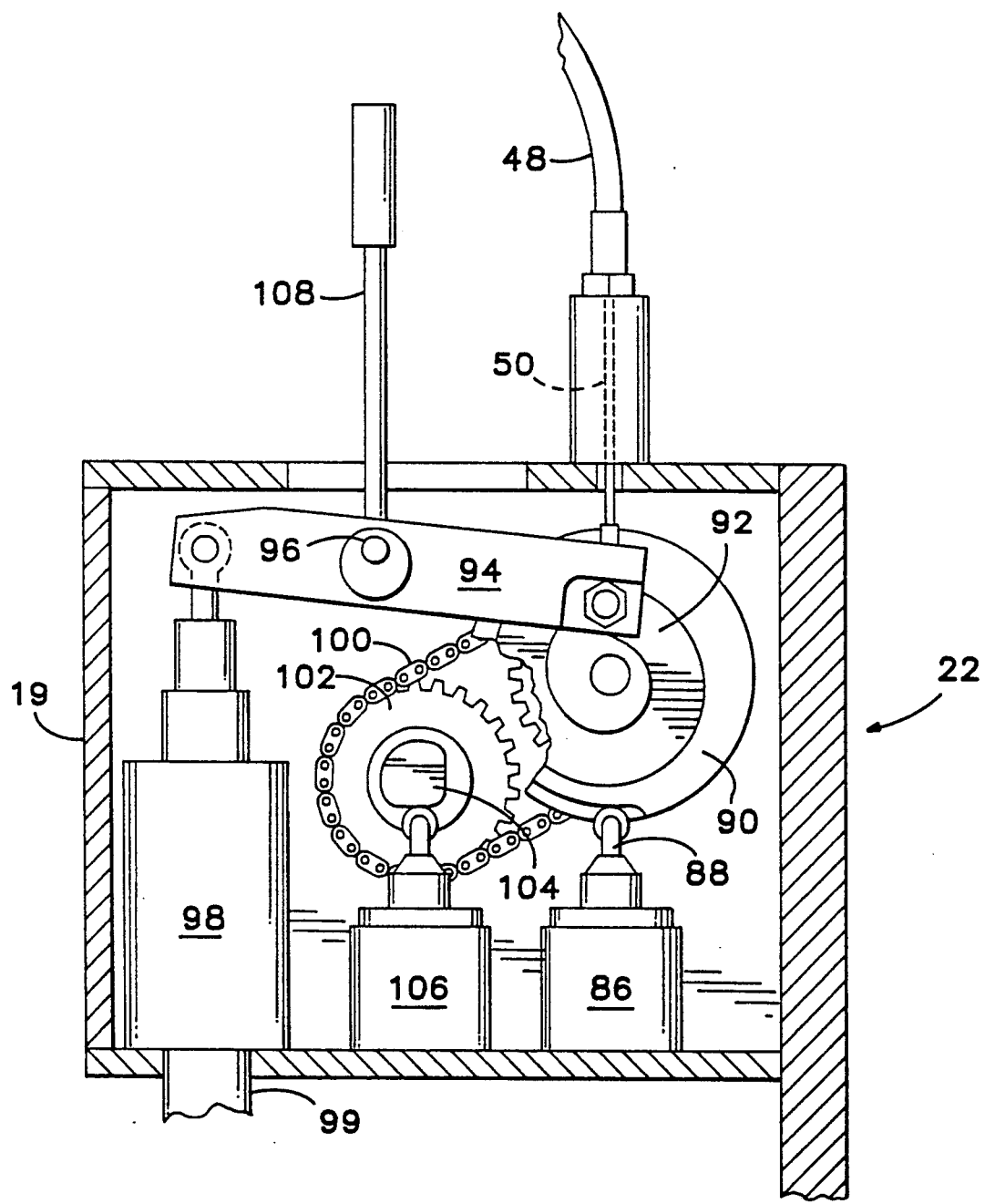
FIG. 5 is a partial cutaway view taken along line 5—5 of FIG. 2.

The piston cylinder 72 is actuated by an air valve 86 through pneumatic lines (not shown). Referring to FIG. 5 the air valve 86 is part of a synchronized drive assembly 22 which synchronously controls the side grinding operation, the top grinding operation, the clamp and release of the saw blade and the advancement of the saw blade as well as the alternate angular orientation of the top grinding assembly 18. The air valve 86 includes a plunger switch 88 that rides in an outer race of a cam 90. The cam 90 also includes an inner race 92 that is followed by a roller (not shown) positioned at one end of a rocker arm 94. The rocker arm 94 pivots about a pivot point 96 creating a push/pull action for both the mechanical link 48 and a reciprocating piston and cylinder 98. The output of the piston and cylinder 98 is a shaft 99 connected to the top grinding assembly 18 at the bearing 20. The cam 90 is driven by a chain 100 disposed about a sprocket 102. The sprocket 102 also includes a cam member 104 that actuates an air valve 106 which controls air cylinders 30 and 29. The up/down stroke of the piston and cylinder 98 may be adjusted by a cam and lever arrangement 108 which alters the range of movement for the end of rocker bar 94 that is attached to the piston and cylinder 98.

In operation the mechanical linkage 48 is retracted by the end of the rocker arm 94 to advance the grinding wheels 40 to grind a first saw tooth. At the same time, piston and cylinder 98 pulls the top grinding assembly along an upstroke to grind a different tooth of the saw blade 11 displaced at the opposite radial end of the saw from the first tooth being ground by the side grinding wheels 40. When the grinding stroke is over, the air cylinders 86 and 106 are actuated to release the blade allowing it to rotate and to shift the angular position of the top grinding assembly 18 in preparation for the next stroke. Before the next stroke, the air cylinder 86 is actuated in the opposite direction causing it to clamp the blade 11 to prevent side-to-side movement.

In this way, the positioning and grinding mechanisms are also controlled from a common synchronized source. Further, the two grinding operations are driven through mechanical linkages that do not depend on air cylinders and pneumatic lines which could require subtle timing adjustments.

Variations of the above apparatus may be made without departing from the spirit of the invention. For example, although the term top grinder has been used to describe the grinding operation of the top grinding assembly 18, that apparatus may also be adjusted to make it a face grinder. Thus, as the term top grinder has been consistently used throughout, it is to be understood that the same term is equally applicable to a face grinding operation. Also, the angle at which the top of each tooth may be ground is adjustable. This could be accomplished by merely altering the tilt of the top grinding assembly 18. This is made possible through a worm gear 110 (shown in phantom outline in FIG. 2) which rotates a shaft 112 that is coupled to the synchronized drive assembly 22.

It will be apparent to those skilled in the art that many variations in mechanical linkages, pneumatic or hydraulic actuators and/or motors operated by microswitches could be employed in order to synchronize the grinding operations and the sequential rotation of the saw blade 11.

Also, although the present apparatus has been constructed such that the saw teeth at opposite radial ends of the saw are ground substantially simultaneously, it should be understood that in this context the term "simultaneously" refers to a grinding operation carried on during a single grinding cycle. For example, it is not necessary for purposes of the invention that the side grinding stroke and the top or face grinding stroke occur at the same time. In fact, such strokes could even be carried out sequentially within a single grinding cycle. A grinding cycle is completed when both teeth are ground, the side clamp mechanism is released and the saw blade is allowed to rotate to the next grinding position.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A combination saw regrinder comprising a side grinder assembly and a top or face grinder assembly for sharpening the teeth of a circular saw blade comprising:
   (a) a pair of rotary side grinding wheels for sharpening a first tooth of said circular saw blade;
   (b) a top grinding wheel for sharpening a second tooth of said circular saw blade;
   (c) clamping means for clamping the circular saw blade to prevent motion thereof; and
   (d) synchronized actuator means for causing said rotary side grinding wheels and said top grinding wheel to engage said first and second teeth, respectively, substantially simultaneously while said saw blade is held in place by said clamping means.

2. The combination saw regrinder of claim 1 wherein said first and second teeth are located at substantially radially opposite ends of said circular saw blade.

3. The combination saw regrinder of claim 1 wherein said synchronized actuator means includes motorized cam means for actuating a first reciprocating drive means for moving said side grinding wheels into and out of engagement with said first tooth, and for actuating a second reciprocating drive means for moving said top grinding wheel into and out of engagement with said second tooth.

4. The combination saw regrinder of claim 3 further including blade rotating means responsive to said clamping means for rotating said saw blade after each grinding cycle.

5. A combination saw regrinder for a circular saw blade including a side grinding assembly for sharpening the side facing portions of a first saw tooth, and a top grinding assembly for simultaneously sharpening the top portion of a second saw tooth said second saw tooth located substantially 180° from said first saw tooth.

6. The combination saw regrinder of claim 5 wherein said side grinding assembly includes a pair of rotary grinding wheels mounted for reciprocating motion along an axis parallel to the plane of the saw blade and wherein said top grinding assembly includes at least a single rotary grinding wheel mounted for reciprocating motion, and further including actuator means for clamping said circular saw in a fixed position and for moving said side grinding wheels and said top grinding wheel into and out of engagement with said first and second saw teeth, respectively, during a single grinding cycle.

7. The combination saw regrinder of claim 6 further including indexing means responsive to said actuator means for rotating said saw blade to a next grinding position at the end of each grinding cycle.

8. The combination saw regrinder of claim 7 further including magnetic slip clutch means for rotatably mounting said saw blade.

9. A method of sharpening a circular saw blade having a plurality of saw teeth comprising the steps of:
   (a) rotating the saw blade about an axis thereof to a grinding position;
   (b) clamping the saw blade in place to prevent rotation thereof;
   (c) sharpening the side portions of a first saw tooth;
   (d) sharpening the top portion of a second saw tooth;
   (e) unclamping the saw blade and rotating the saw blade to a next grinding position.

10. The method of claim 9 wherein steps (c) and (d) are carried out substantially simultaneously.

11. The method of claim 9 wherein step (d) is carried out on a saw tooth located substantially 180° from the first saw tooth.

* * * * *

UNITED STATES PATENT AND TRADEMARK OFFICE
CERTIFICATE OF CORRECTION

PATENT NO. : 5,152,193
DATED : October 6, 1992
INVENTOR(S) : James Emter

It is certified that error appears in the above-indentified patent and that said Letters Patent is hereby corrected as shown below:

```
Column 1, Lines 39-40, delete "application Ser.
No. 07/429,396 filed Oct. 31, 1989 and"
insert -- No. 5,038,639--.
```

Signed and Sealed this

Thirtieth Day of May, 1995

Attest:

BRUCE LEHMAN

Attesting Officer     *Commissioner of Patents and Trademarks*